United States Patent
Claessens (10) Patent No.: US 11,163,130 B2
(45) Date of Patent: Nov. 2, 2021

(54) CABLE FIXATION ASSEMBLY FOR A CABLE HAVING A STRENGTH MEMBER

(71) Applicant: COMMSCOPE CONNECTIVITY BELGIUM BVBA, Kessel-Lo (BE)

(72) Inventor: Bart Mattie Claessens, Hasselt (BE)

(73) Assignee: COMMSCOPE CONNECTIVITY BELGIUM BVBA, Kessel-Lo (BE)

( * ) Notice: Subject to any disclaimer, the term of this patent is extended or adjusted under 35 U.S.C. 154(b) by 0 days.

(21) Appl. No.: 16/638,685

(22) PCT Filed: Aug. 13, 2018

(86) PCT No.: PCT/EP2018/071932
§ 371 (c)(1),
(2) Date: Feb. 12, 2020

(87) PCT Pub. No.: WO2019/034613
PCT Pub. Date: Feb. 21, 2019

(65) Prior Publication Data
US 2020/0363599 A1    Nov. 19, 2020

Related U.S. Application Data

(60) Provisional application No. 62/545,583, filed on Aug. 15, 2017.

(51) Int. Cl.
*G02B 6/44* (2006.01)
*G02B 6/38* (2006.01)

(52) U.S. Cl.
CPC ......... *G02B 6/4477* (2013.01); *G02B 6/3887* (2013.01)

(58) Field of Classification Search
None
See application file for complete search history.

(56) References Cited

U.S. PATENT DOCUMENTS

| | | | |
|---|---|---|---|
| 5,793,921 A | 8/1998 | Wilkins et al. | |
| 10,379,310 B2 | 8/2019 | Aznag et al. | |
| 2013/0233615 A1* | 9/2013 | Pimentel | H02G 15/007 174/650 |
| 2015/0010282 A1* | 1/2015 | Yokochi | G02B 6/4435 385/102 |
| 2015/0093090 A1 | 4/2015 | Aznag et al. | |

(Continued)

FOREIGN PATENT DOCUMENTS

| | | |
|---|---|---|
| EP | 1 020 750 A2 | 7/2000 |
| EP | 2 551 708 A1 | 1/2013 |
| WO | 95/24667 A1 | 9/1995 |

(Continued)

OTHER PUBLICATIONS

International Search Report and Written Opinion of the International Searching Authority for International Patent Application No. PCT/EP2018/071932 dated Nov. 2, 2018, 14 pages.

*Primary Examiner* — Jerry Rahll
(74) *Attorney, Agent, or Firm* — Merchant & Gould P.C.

(57) ABSTRACT

Optical cable fixation assemblies (100) include a strength member constraining sleeve (200) adapted to at least substantially radially surround an exposed portion of an affixed cable strength member (6) to minimize buckling and/or breakage of the strength member (6) due to stresses imparted to the cable during, e.g., fixation and load testing procedures associated with the cable.

22 Claims, 8 Drawing Sheets

(56) References Cited

U.S. PATENT DOCUMENTS

2015/0378106 A1* 12/2015 Allen .................. G02B 6/4471
　　　　　　　　　　　　　　　　　　　　　385/137
2020/0003984 A1　　1/2020　Aznag et al.

FOREIGN PATENT DOCUMENTS

WO　　2013/090736 A1　　6/2013
WO　　2013/149857 A1　　10/2013

* cited by examiner

CABLE FIXATION ASSEMBLY FOR A CABLE HAVING A STRENGTH MEMBER

CROSS-REFERENCE TO RELATED APPLICATION

This application is a National Stage Application of PCT/EP2018/071932, filed on Aug. 13, 2018, which claims the benefit of U.S. Patent Application Ser. No. 62/545,583, filed on Aug. 15, 2017, the disclosures of which are incorporated herein by reference in their entireties. To the extent appropriate, a claim of priority is made to each of the above disclosed applications.

BACKGROUND

Telecommunications systems typically employ a network of telecommunications cables capable of transmitting large volumes of data and voice signals over relatively long distances. Telecommunications cables can include fiber optic cables, electrical cables, or combinations of electrical and fiber optic cables. A typical telecommunications network also includes a plurality of telecommunications enclosures integrated throughout the network of telecommunications cables. The telecommunications enclosures or "closures" are adapted to house and protect telecommunications components such as splices, termination panels, power splitters, and wave division multiplexers.

Typically, a closure defines one or more cable ports that receive optical cables holding one or more optical fibers. The cable ports can be adapted to seal around the cables. Fibers from the cable(s) can be routed, split, spliced, organized, etc. within the closure. Typically, cables entering telecommunications enclosures must be fixed in place inside the closure. Cable fixation units secured to the interior of the closure can be used for this purpose.

There are many types of telecommunications cables that can be terminated within a telecommunications enclosure including, e.g., trunk cables and drop cables. For example, a trunk cable can enter a cable port of a closure, be affixed to the interior of the closure, and optical fibers of the trunk cable can be spliced within the closure to optical fibers of one or more drop cables entering the same closure through other cable ports.

The configuration of cables that terminate in a closure can also vary widely. Typically, an outer ruggedized protective jacket of the cable defines an axially extending interior volume of the cable. The interior volume can be configured to rigidly hold optical fibers or loosely hold optical fibers. In some examples, individual fibers or groups of fibers are held within flexible inner tubes or sheaths within the cable's interior volume. In addition, the cable can include one or more strength members that enhance the cable's rigidity and inhibit undesirable bending of the optical fibers it contains. Depending on the size and type of the cable, the strength member can include a single member or multiple members, and the members can be flexible or rigid. The strength member(s) can be held loosely or rigidly within the interior volume defined by the outer jacket of the cable.

Certain actions performed on an optical cable, such as termination, fixation, load testing, heat shrinking or other squeezing, etc., can cause its optical fibers to "creep" or "grow," i.e., to axially extend beyond the end of the cable proper. The growing can refer to the fibers growing relative to their inner tubes/sheaths, or the inner tubes/sheaths containing the fibers growing relative to the cable. This phenomenon is particularly prevalent with cables whose optical fibers are only loosely held within the cable's interior volume. This type of growth or creeping can damage the optical fibers, particularly inside an enclosure where the growth can cause the fibers to collide with other structures and thereby become damaged or bent beyond the fibers' minimum bend radius requirements for optimal signal transmission.

Affixing the cable strength member can help to axially stabilize the optical fibers and thereby help to reduce the growth/creeping of the optical fibers. However, certain stresses applied to the cable can cause an affixed strength member to buckle and break, thereby exacerbating the undesirable and potentially damaging growth/creeping of the optical fibers. In addition, breakage of the strength member itself can directly harm the optical fibers that, e.g., come into contact with shards of the broken strength member.

SUMMARY

In general terms, the present disclosure is directed to cable fixation assemblies and their components, as well as methods of assembling these assemblies.

According to certain aspects of the present disclosure, a cable fixation assembly comprises an optical cable having an outer jacket defining an axially extending interior volume, the cable further comprising an optical fiber and a strength member partially disposed within the interior volume, the at least one strength member axially protruding beyond a distal end of the interior volume, the assembly further comprising a cable fixation unit having a main body defining a cable jacket mounting portion and a strength member clamp disposed distally from the cable jacket mounting portion, wherein a distal portion of the strength member is disposed within a clamping region of the strength member clamp such that an axial segment of the strength member is defined between a proximal end of the clamping region and the distal end of the interior volume, wherein the assembly further comprises a strength member constraining sleeve having a wall that at least substantially radially surrounds at least 25% of the axial segment of the strength member.

In some examples, the assembly further includes a telecommunications closure, wherein the cable fixation unit is affixed to the telecommunications closure and disposed in an interior volume defined by the telecommunications closure.

According to further aspects of the present disclosure, a cable fixation assembly comprises an optical cable having an outer jacket defining an axially extending interior volume, the cable further comprising an optical fiber and a strength member partially disposed within the interior volume, the at least one strength member axially protruding beyond a distal end of the interior volume, the assembly further comprising a cable fixation unit defining a cable jacket mounting portion, the assembly further comprising a strength member clamp disposed distally from the cable jacket mounting portion, wherein a distal portion of the strength member is disposed within a clamping region of the strength member clamp such that an axial segment of the strength member is defined between a proximal end of the clamping region and the distal end of the interior volume, wherein the assembly further comprises a strength member constraining sleeve having a wall that at least substantially radially surrounds at least 50% of the axial segment of the strength member.

In some examples, at least 30% of the axial segment of the strength member is at least substantially radially surrounded by the strength member constraining sleeve.

In some examples, at least 35% of the axial segment of the strength member is at least substantially radially surrounded by the strength member constraining sleeve.

In some examples, at least 40% of the axial segment of the strength member is at least substantially radially surrounded by the strength member constraining sleeve.

In some examples, at least 45% of the axial segment of the strength member is at least substantially radially surrounded by the strength member constraining sleeve.

In some examples, at least 50% of the axial segment of the strength member is at least substantially radially surrounded by the strength member constraining sleeve.

In some examples, at least 55% of the axial segment of the strength member is at least substantially radially surrounded by the strength member constraining sleeve.

In some examples, at least 60% of the axial segment of the strength member is at least substantially radially surrounded by the strength member constraining sleeve.

In some examples, at least 65% of the axial segment of the strength member is at least substantially radially surrounded by the strength member constraining sleeve.

In some examples, at least 70% of the axial segment of the strength member is at least substantially radially surrounded by the strength member constraining sleeve.

In some examples, at least 75% of the axial segment of the strength member is at least substantially radially surrounded by the strength member constraining sleeve.

In some examples, at least 80% of the axial segment of the strength member is at least substantially radially surrounded by the strength member constraining sleeve.

In some examples, at least 85% of the axial segment of the strength member is at least substantially radially surrounded by the strength member constraining sleeve.

In some examples, at least 90% of the axial segment of the strength member is at least substantially radially surrounded by the strength member constraining sleeve.

In some examples, at least 95% of the axial segment of the strength member is at least substantially radially surrounded by the strength member constraining sleeve.

In some examples, at least 99% of the axial segment of the strength member is at least substantially radially surrounded by the strength member constraining sleeve.

In some examples, 100% of the axial segment of the strength member is at least substantially radially surrounded by the strength member constraining sleeve.

In some examples, at least two thirds of the axial segment of the strength member is at least substantially radially surrounded by the strength member constraining sleeve.

In at least some examples, the more of the axial segment of the strength member that is at least substantially radially surrounded by the constraining sleeve the more that undesirable buckling of the strength member will be minimized.

In some examples, the strength member constraining sleeve is deformable and at least partially deformed by the strength member clamp.

In some examples, the strength member constraining sleeve includes a cover defining a distal end of the strength member constraining sleeve and wherein a distal end of the strength member abuts a proximally facing surface of the cover.

In some examples, the strength member constraining sleeve includes axial slit defined between two ends of the wall, the axial slit having a width that is smaller than a width of the cable strength member.

In some examples, the wall of the strength member constraining sleeve includes one or more holes.

In some examples, the wall of the strength member constraining sleeve is substantially tubular.

In some examples, an axial strip of the wall of the strength member constraining sleeve is substantially flat.

According to further aspects of the present disclosure, an optical cable strength member constraining sleeve comprises a substantially tubular and deformable wall defining an interior volume having proximal and distal ends, the strength member constraining sleeve further comprising one or more of: an axially extending slit defined between two ends of the wall, and/or a at least one hole in the wall, and/or a cover coupled to the wall and adjacent to the distal end of the interior volume of the sleeve, and/or an axial strip of the wall that is substantially flat.

According to still further aspects of the present disclosure, a method comprises: stripping a jacket of a distal portion of a fiber optic cable, the jacket of the fiber optic cable defining an axially extending interior volume holding at least one optical fiber and at least one strength member; cutting a distal section of the strength member such that a protruding portion of the strength member axially protrudes from a distal end of the interior volume of the cable by a predefined distance; positioning a strength member constraining sleeve about the protruding portion of the strength member such that a wall of the strength member constraining sleeve substantially radially surrounds the protruding portion of the strength member; clamping the protruding portion of the strength member in a clamping region of a strength member clamp; and clamping a jacketed portion of the cable to a cable fixation unit; wherein an axial segment of the strength member is defined between a proximal end of the clamping region and the distal end of the interior volume, and wherein the wall of the strength member constraining sleeve at least substantially radially surrounds at least 30%, at least 35%, at least 40%, at least 45%, at least 50%, at least 55%, at least 60%, at least 65%, at least two thirds, at least 70%, at least 75%, at least 80%, at least 85%, at least 90%, at least 95%, or at least 99% of the axial segment of the strength member.

In some examples, the clamping of the protruding portion of the strength member includes clamping the strength member constraining sleeve in the clamping region of the strength member clamp.

In some examples, the clamping of the strength member constraining sleeve includes deforming the strength member constraining sleeve.

In some examples, the strength member constraining sleeve includes one or more holes in the wall and/or an axially extending slit to facilitate deforming the strength member constraining sleeve in the strength member clamp.

In some examples, the clamping of the jacketed portion of the cable includes tightening a strap around the jacketed portion of the cable and securing the strap to the cable fixation unit.

In some examples, the method also includes affixing the cable fixation unit to a telecommunications closure.

A variety of additional inventive aspects will be set forth in the description that follows. The inventive aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

When affixing certain cables to certain structures, a portion of the cable's strength member protrudes from the front of the cable. Under some circumstances, the protruding portion of the cable strength member is clamped independently of the end of the cable in order to, e.g., axially stabilize the optical fibers protruding from the end of the cable. However, once clamped, there can be a tendency for the protruding portion of the strength member to buckle and break, particularly when, e.g., affixing or otherwise squeezing the cable or load testing the cable. Breakage of the strength member can damage optical fibers nearby. It can also axially destabilize the optical fibers, allowing the optical fibers to creep or grow out of the fixated end of the cable when, e.g., clamping the cable. This can also result in optical fiber damage and/or signal transmission degradation.

Fiber optic cable fixation assemblies and assembly components according to the present disclosure can help to reduce or minimize buckling of a cable strength member when affixing the cable to another structure by constraining an unclamped or exposed region of the protruding portion of the strength member. This can reduce the chances of undesirable buckling and/or breakage of the strength member.

Figures 1, 2:
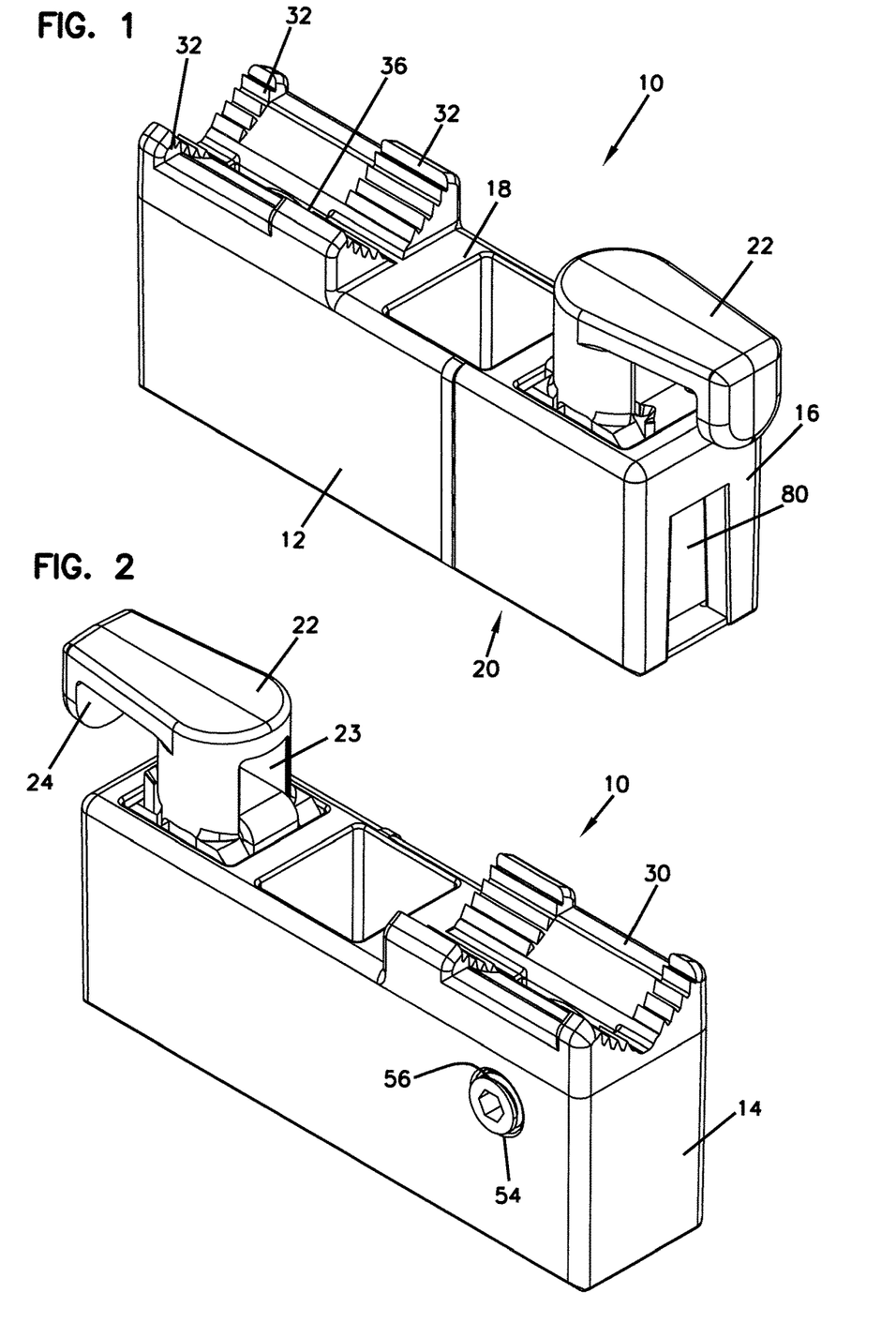
FIG. 1 is a perspective view of an example cable fixation unit according to the present disclosure.
FIG. 2 is a further perspective view of the cable fixation unit of FIG. 1.
Figure 3:
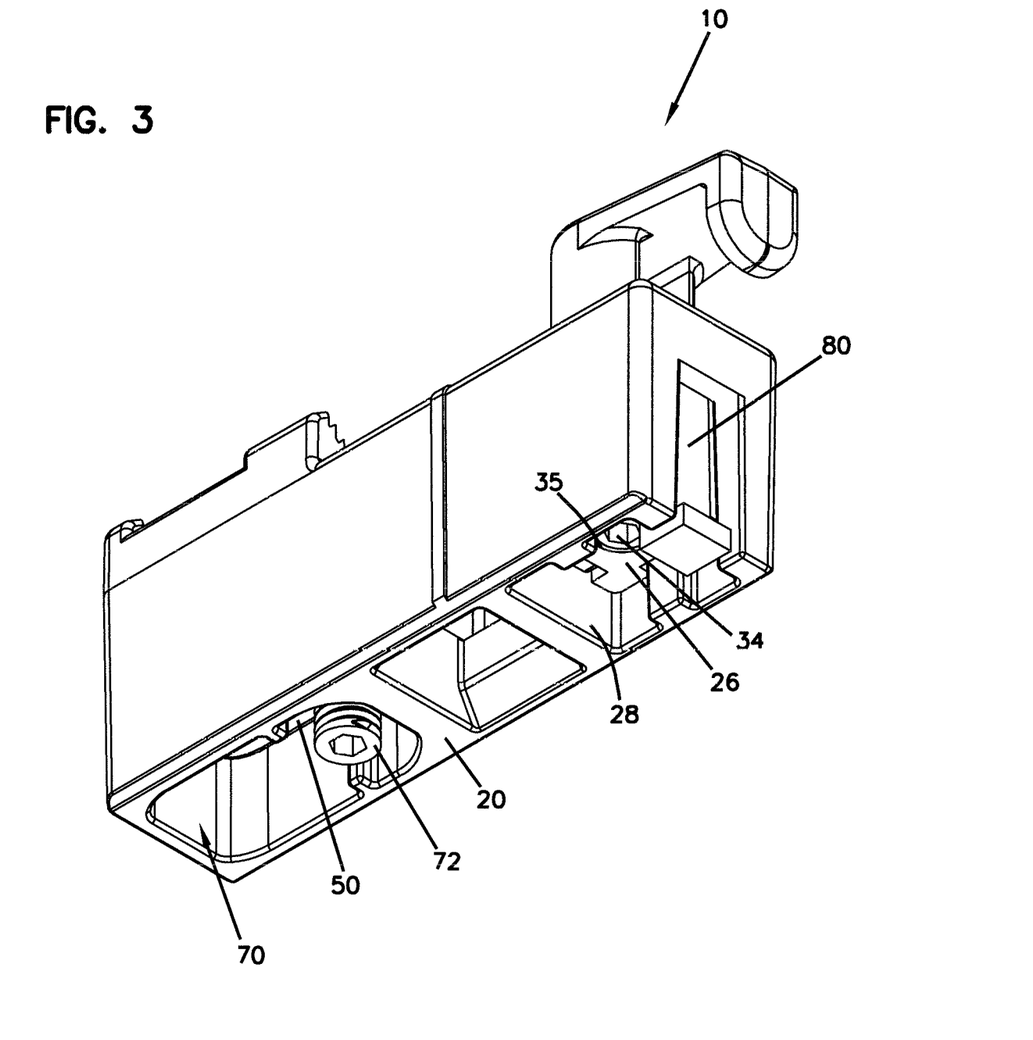
FIG. 3 is a further perspective view of the cable fixation unit of FIG. 1.
Figure 4:
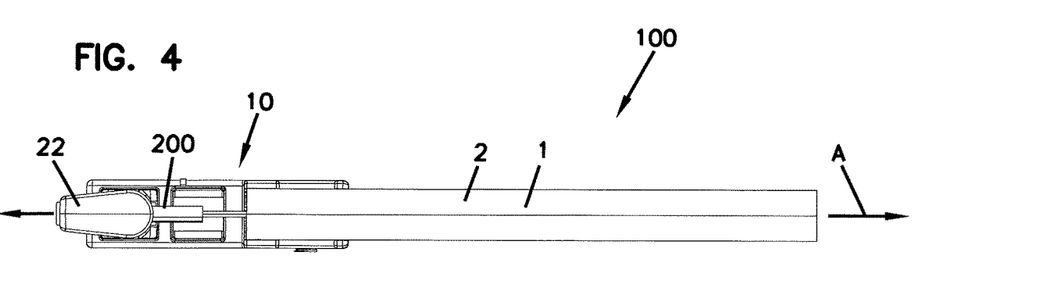
FIG. 4 is a top view of an example cable fixation assembly according to the present disclosure.

Referring to FIGS. 1-3, an example cable fixation unit 10 includes a main body 12 generally defined by a top 18, a bottom 20, a proximal end 14 and a distal end 16. The cable fixation unit 10 includes a cable jacket mounting portion 30 and a strength member clamp 22 defining a clamping region 23 and a distal stopping flange 24.

Optionally, the strength member clamp 22 includes a base 26 that can be secured in a distal cavity 28 defined by the main body 12 of the cable fixation unit 10. The base 26 can receive an adjustable clamping component 34, such as a set screw within a vertically oriented through hole 35 of the base 26, the through hole 35 being in communication with the clamping region 23. The adjustable clamping component 34 can be adjusted upward or downward within the through hole 35 to tighten or loosen, respectively, a clamp on a strength member disposed in the clamping region 23.

The proximally facing surface of the distal stopping flange 24 can define a distal limit for the distal end of a cable strength member clamped in the strength member clamp 22.

Figure 9:
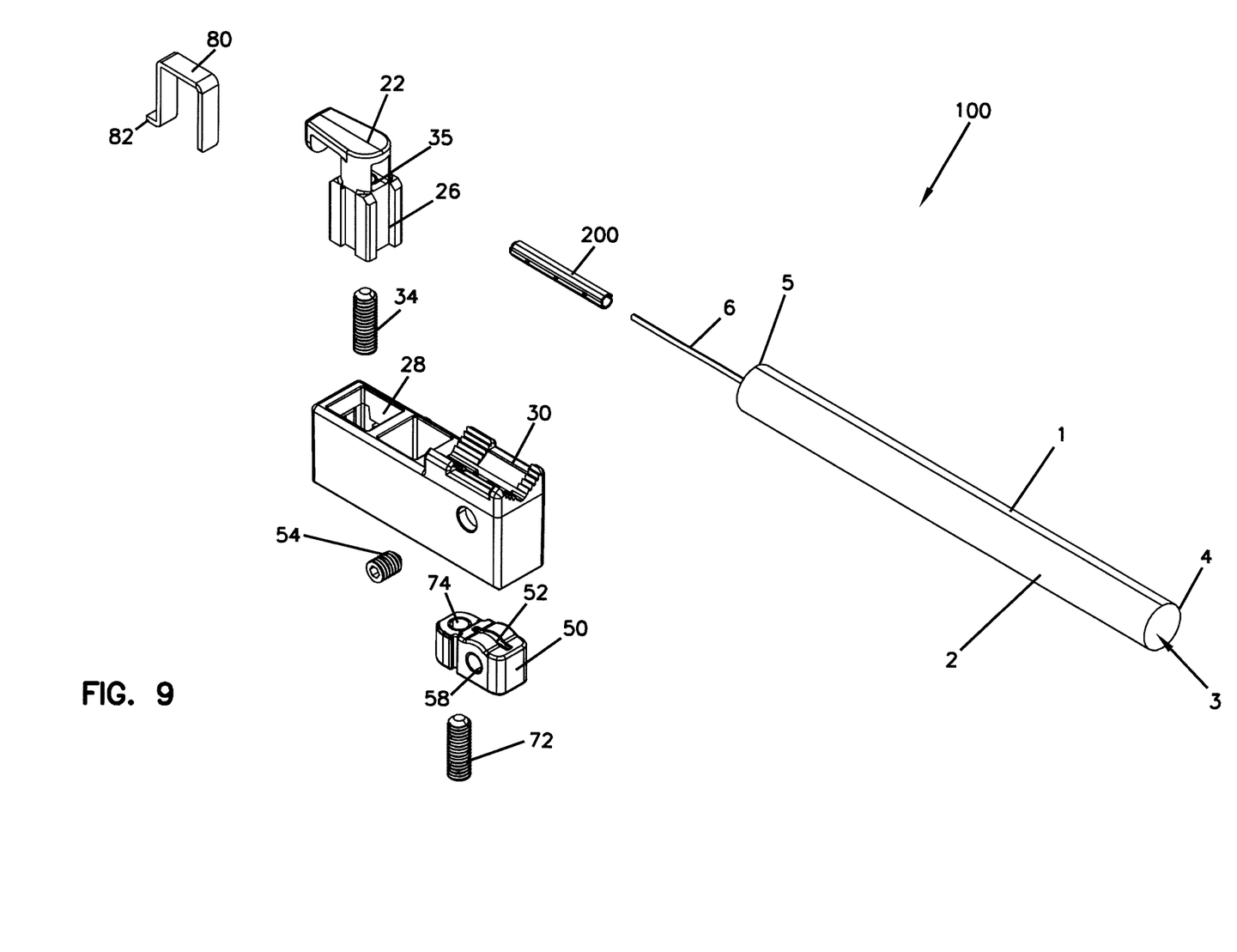
FIG. 9 is an exploded view of the cable fixation assembly of FIG. 4.
Figure 10:
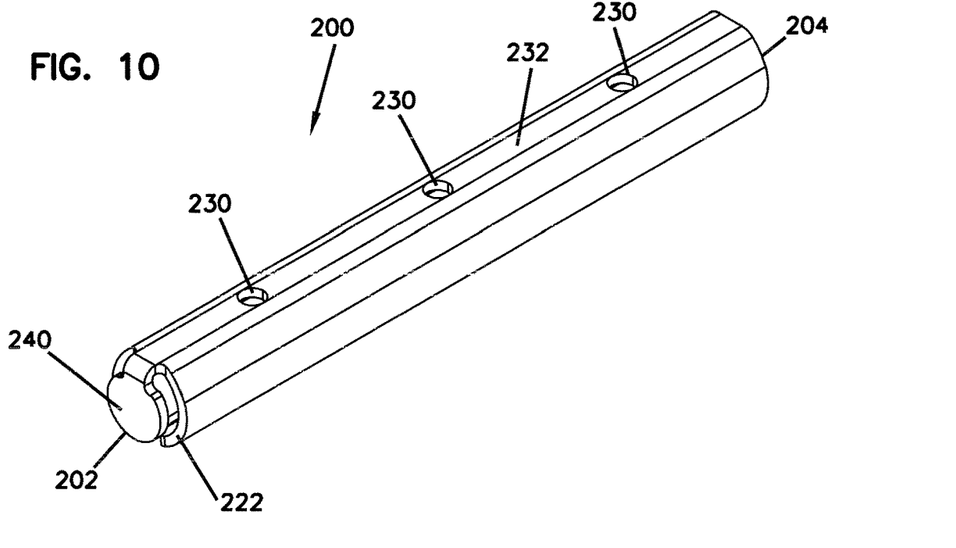
FIG. 10 is a perspective view of an example strength member constraining sleeve according to the present disclosure.
Figures 11, 12:
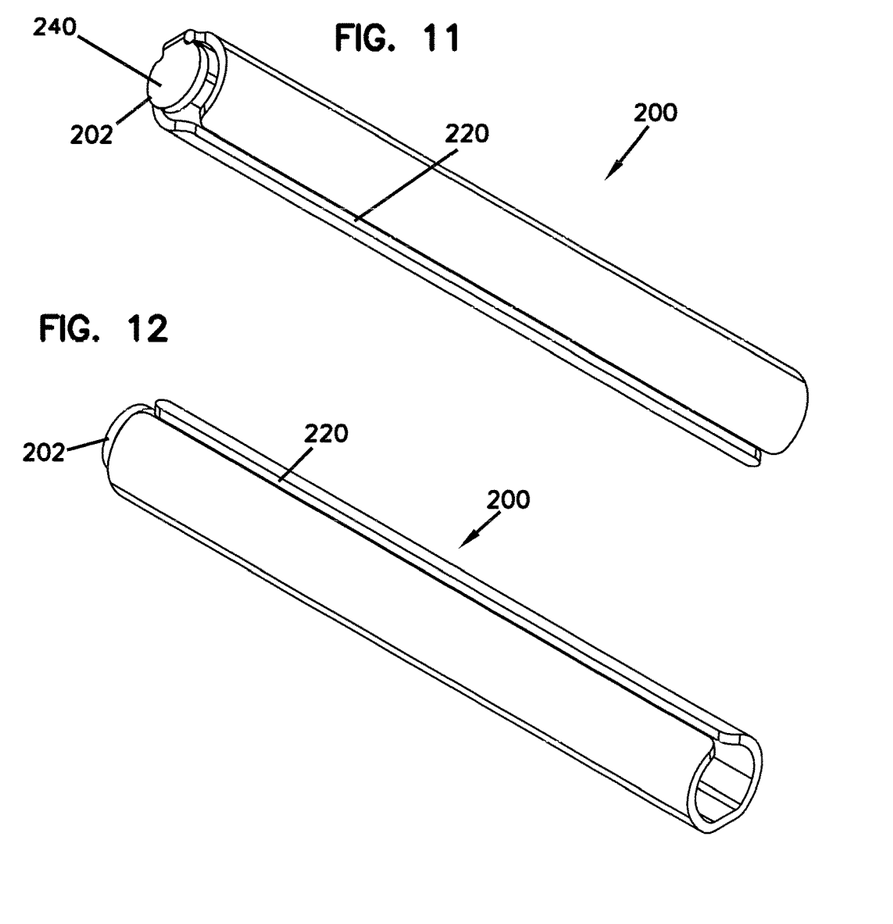
FIG. 11 is a further perspective view of the strength member constraining sleeve of FIG. 10.
FIG. 12 is a further perspective view of the strength member constraining sleeve of FIG. 10.
Figure 13:
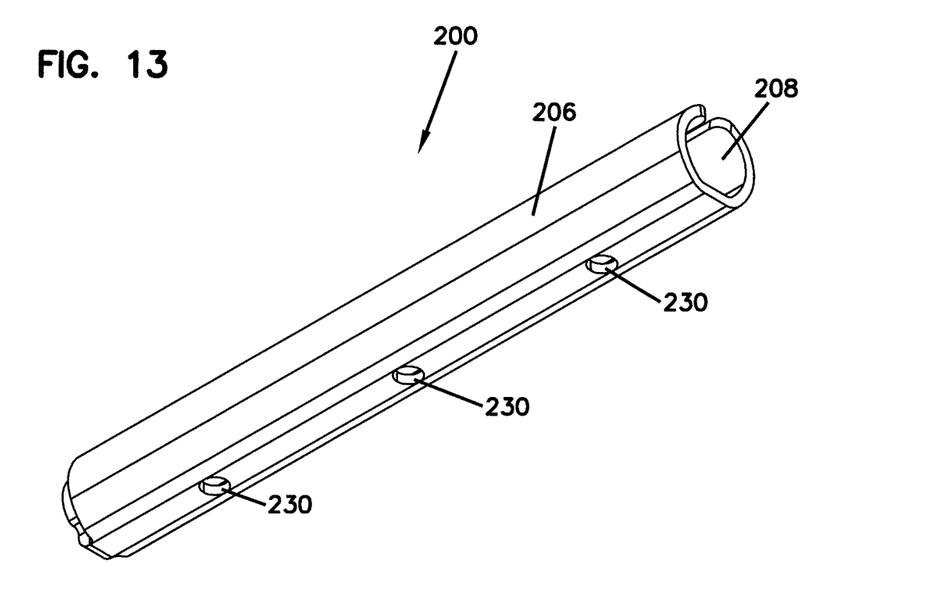
FIG. 13 is a further perspective view of the strength member constraining sleeve of FIG. 10.
Figure 14:
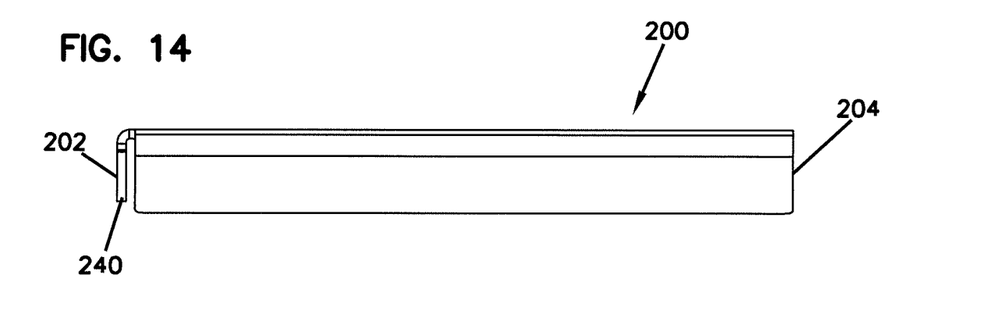
FIG. 14 is a side view of the strength member constraining sleeve of FIG. 10.

The cable jacket mounting portion 30 can include a plurality of gripping teeth 32. The gripping teeth 32 can aid in stabilizing the cable. A slot 36 is adapted to receive, e.g., a strap 11 (FIG. 16), that circumferentially surrounds and secures the cable to the jacket mounting portion 30. The ends of the strap pass through the slot 36 and, in some examples, are received in a stabilizing block 50, which can include a corresponding slot 52 (FIG. 9). A fastener, such as a set screw 54, can secure the strap to the stabilizing block 50, the fastener being received through an opening 56 in a side of the main body 12 of the cable fixation unit, and a corresponding opening 58 (FIG. 9) in the stabilizing block 50.

The stabilizing block 50 can be received in a proximal cavity 70 defined by the main body 12 of the cable fixation unit 10 and secured therein, e.g., with a fastener 72 received in a vertically oriented through hole 74 of the stabilizing block 50.

Optionally, the base 26 of the strength member clamp 22 can be slidably retained within the distal cavity 28 by a retainer 80. The retainer 80 is a substantially U-shaped piece adapted to fit in opposing vertical grooves of the base 26. The "top" of the U passes through the clamping region 23 and can move up and down within the clamping region 23 by adjusting the adjustable clamping component 34. Thus, when the strength member 6 is clamped in the clamping region 23, the retainer 80 can abut and apply clamping force to the strength member 6 or the strength member retaining sleeve 200. The retainer 80 can include a foot 82 that extends into a slot 84 of the main body 12 of the cable fixation unit to prevent the base 26 from sliding entirely out of the distal cavity 28.

Referring now to FIGS. 4-9, a cable fixation assembly 100 includes a cable 1, a strength member constraining sleeve 200 and the cable fixation unit 10 described above. The cable 1 is defined by a longitudinal axis A. The cable 1 can be any length and includes an outer protective jacket 2 defining an interior volume 3 of the cable 1. The interior volume 3 extends axially from a proximal end 4 to a distal end 5.

The interior volume 3 houses one or more optical fibers (not shown in FIGS. 4-9). The optical fibers can be organized within the interior volume 3 in a number of different ways, e.g., as loose fibers or groups of fibers housed in inner tubes/sheaths. The interior volume 3 also houses a strength member 6, which can provide some rigidity/ruggedness to the cable 1.

A distal portion 7 of the jacket 2 is secured, e.g., by a strap 11 (FIG. 16) to the cable jacket mounting portion 30 of the cable fixation unit 10.

In FIGS. 4-9, a distal portion of the jacket 2 has been stripped beyond the distal end 5 of the interior volume 3. The strength member 6 (and any optical fibers) axially protrude in the distal direction from the distal end 5 of the interior volume 3. A portion of the axially protruding strength member is received in the clamping region 23 of the strength member clamp 22.

The strength member constraining sleeve 200 substantially radially surrounds at least a portion of the axially protruding strength member 6. Optionally, as shown, a portion of the strength member constraining sleeve 200 is also disposed within the clamping region 23 of the strength member clamp 22, and can be clamped together with the strength member 6 by the strength member clamp 22.

Optionally, the strength member constraining sleeve 200 extends distally beyond a distal end of the strength member 6. Thus, for example, the distal end 202 of the strength member constraining sleeve 200 can be disposed distally from the distal end of the strength member 6, and the distal stopping flange 24 defines a distal limit for the distal end 202 of the strength member constraining sleeve 200 clamped in the strength member clamp 22.

Figure 5:
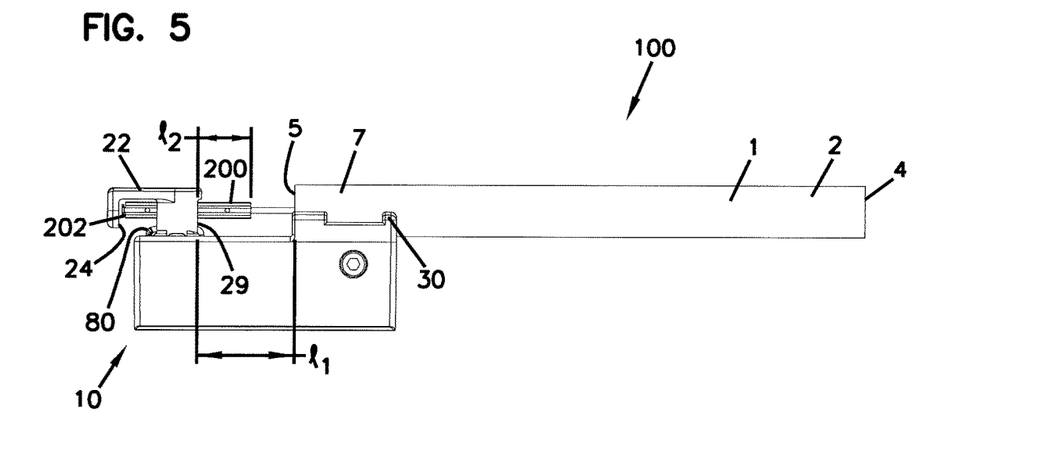
FIG. 5 is a side view of the cable fixation assembly of FIG. 4.
Figure 6:
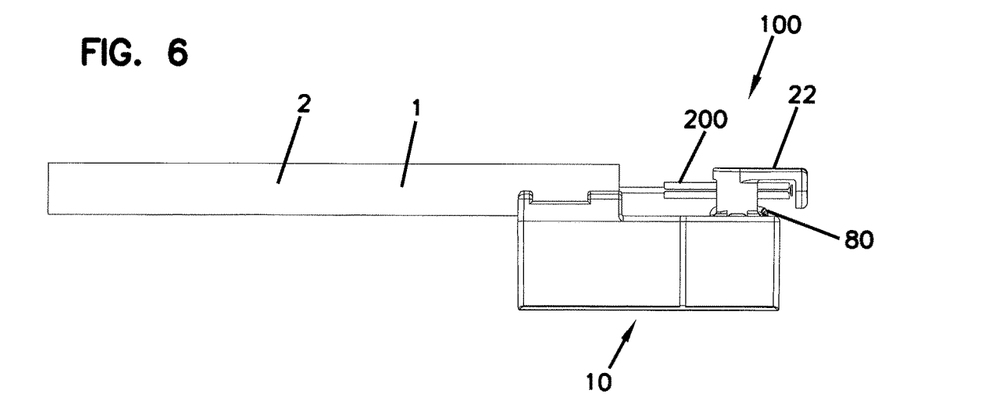
FIG. 6 is a further side view of the cable fixation assembly of FIG. 4.
Figure 7:
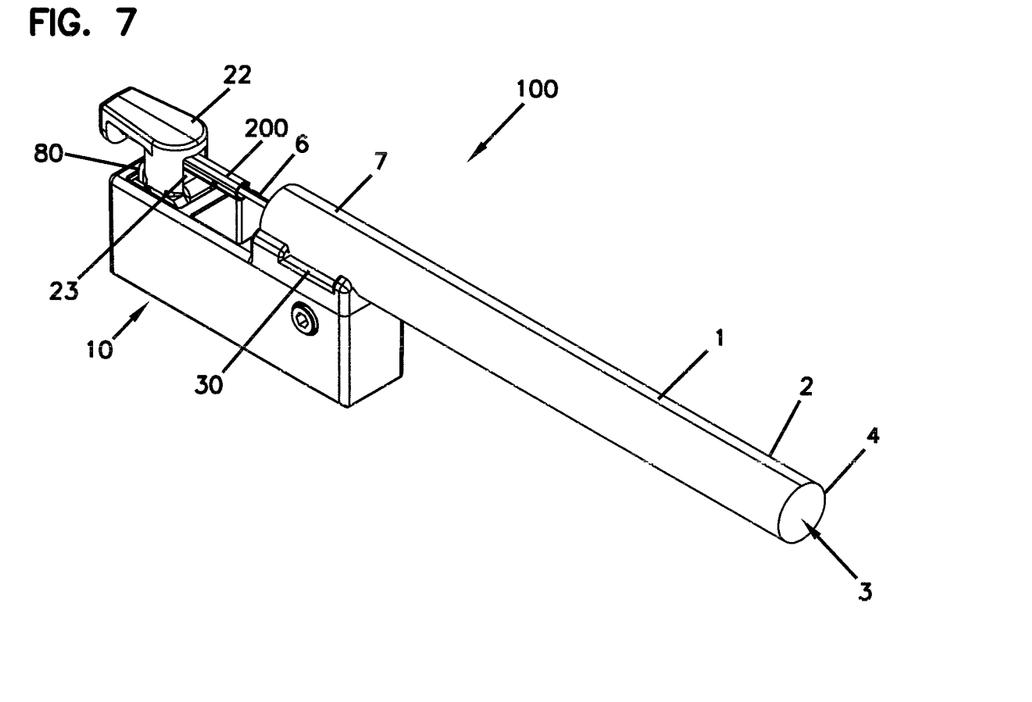
FIG. 7 is a perspective view of the cable fixation assembly of FIG. 4.
Figure 8:
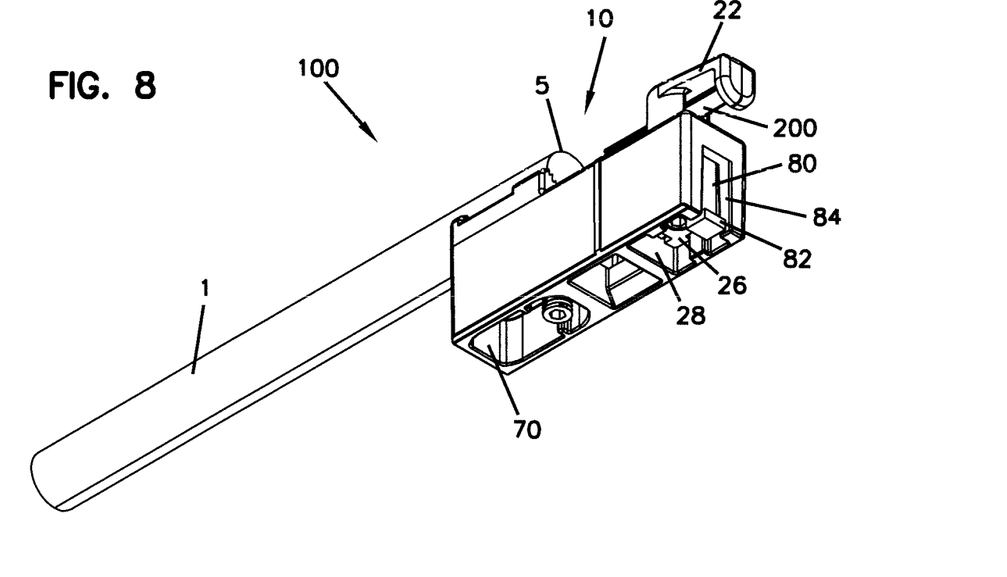
FIG. 8 is a further perspective view of the cable fixation assembly of FIG. 4.

Referring to FIG. 5, an axial segment of length $l_1$ of the strength member 6 is defined between a proximal end 29 of the clamping region 23 and the distal end 5 of the interior volume 3 of the cable 1. The strength member constraining sleeve 200 substantially radially surrounds a portion of the axial segment of the strength member 6, the portion having a length $l_2$.

In some examples, the length $l_2$ is at least 30% as long as $l_1$. In some examples, the length $l_2$ is at least 35% as long as $l_1$. In some examples, the length $l_2$ is at least 40% as long as $l_1$. In some examples, the length $l_2$ is at least 45% as long as $l_1$. In some examples, the length $l_2$ is at least 50% as long as $l_1$. In some examples, the length $l_2$ is at least 55% as long as $l_1$. In some examples, the length $l_2$ is at least 60% as long as $l_1$. In some examples, the length $l_2$ is at least 65% as long as $l_1$. In some examples, the length $l_2$ is at least 70% as long as $l_1$. In some examples, the length $l_2$ is at least 75% as long as $l_1$. In some examples, the length $l_2$ is at least 80% as long as $l_1$. In some examples, the length $l_2$ is at least 85% as long as $l_1$. In some examples, the length $l_2$ is at least 90% as long as $l_1$. In some examples, the length $l_2$ is at least 95% as long as $l_1$. In some examples, the length $l_2$ is at least 99% as long as $l_1$. In some examples, the length $l_2$ is the same length as $l_1$. In some examples, the length $l_2$ is at least two thirds as long as $l_1$.

The substantial surrounding of the axial strength member by the strength member constraining sleeve 200 in the exposed/unclamped $l_1$ region can minimize buckling of the strength member 6 when it is clamped, thereby reducing the likelihood that the strength member 6 will break.

Referring now to FIGS. 10-15, the example strength member constraining sleeve 200 is a substantially tubular structure made from a rigid but deformable material (such as aluminum or other metal), extending axially between a distal end 202 and a proximal end 204. The wall 206 of the strength member constraining sleeve 200 extends between an inner surface 207 and an outer surface 209, the inner surface 207 defining an interior volume 208 of the strength member constraining sleeve 200, which receives the strength member 6.

Optionally, the strength member constraining sleeve 200 includes an axially extending slit 220 defined between the proximal end 204 of the wall 206 and the distal end 222 of the wall 206. The axial slit 220 has a radial width that is smaller than a width of the cable strength member 6 to minimize or prevent undesirable movement (e.g., from buckling) of the strength member 6 through the slit 220.

Optionally, the wall 206 includes one or more holes 230 in communication with the interior volume 208.

The axial slit 220 and/or the hole(s) 230 can facilitate deformation of the strength member constraining sleeve 200 by the clamp 22.

Optionally, the holes 230 are in an axial strip 232 of the wall 206 that is substantially flat to facilitate creation of the holes and/or to facilitate to deformation of the strength member constraining sleeve.

Optionally, a cover 240 is coupled to the wall 206. The cover 240 includes a stopping surface 242 facing the proximal end 204 of the strength member constraining sleeve 200. The stopping surface 242 can define a distal extreme for the distal end of the strength member 6. That is, in some examples the stopping surface 242 prevents the strength member from protruding beyond the cover 240 of the strength member constraining sleeve 200. In this manner, the cover 240 can aid in properly positioning the strength member constraining sleeve 200 about the strength member 6. For example, the axial length of the strength member constraining sleeve 200 can be selected such that the distal end of the strength member 6 abuts the stopping surface 242 and such that, at the same time, the strength member constraining sleeve 200 substantially radially surrounds at least the desired fraction of the axial segment ($l_1$) of the strength member disposed between the proximal end of the clamping region of the clamp and the distal end of the interior volume of the cable. Thus, the cover 240 can prevent the strength member constraining sleeve 200 from moving out of its proper position relative to the strength member 6.

Figure 15:
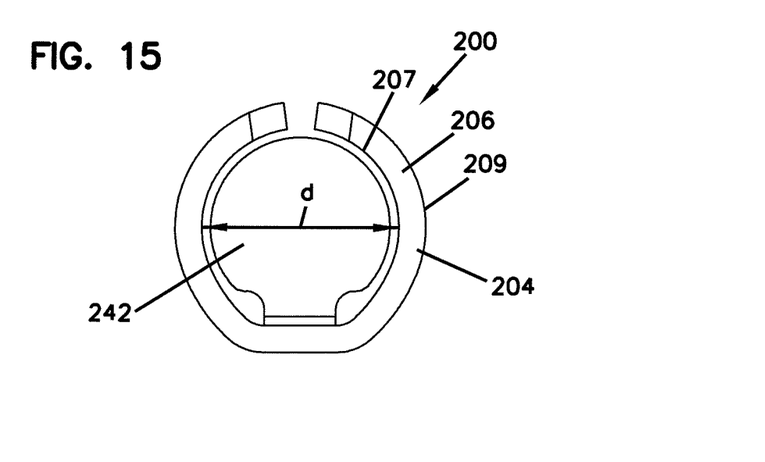
FIG. 15 is a proximal end view of the strength member constraining sleeve of FIG. 10.

Referring to FIG. 15, a maximum diameter d of the interior volume 208 can be selected as a function of a width of the strength member 6 received in the interior volume 208 in order to minimize potentially damaging buckling of the strength member 6. In some examples, the maximum thickness of the strength member 6 is at least, e.g., 10%, 20%, 30%, 40%, 50%, 60%, 70%, 80%, or 90% of the maximum width d.

Figure 16:
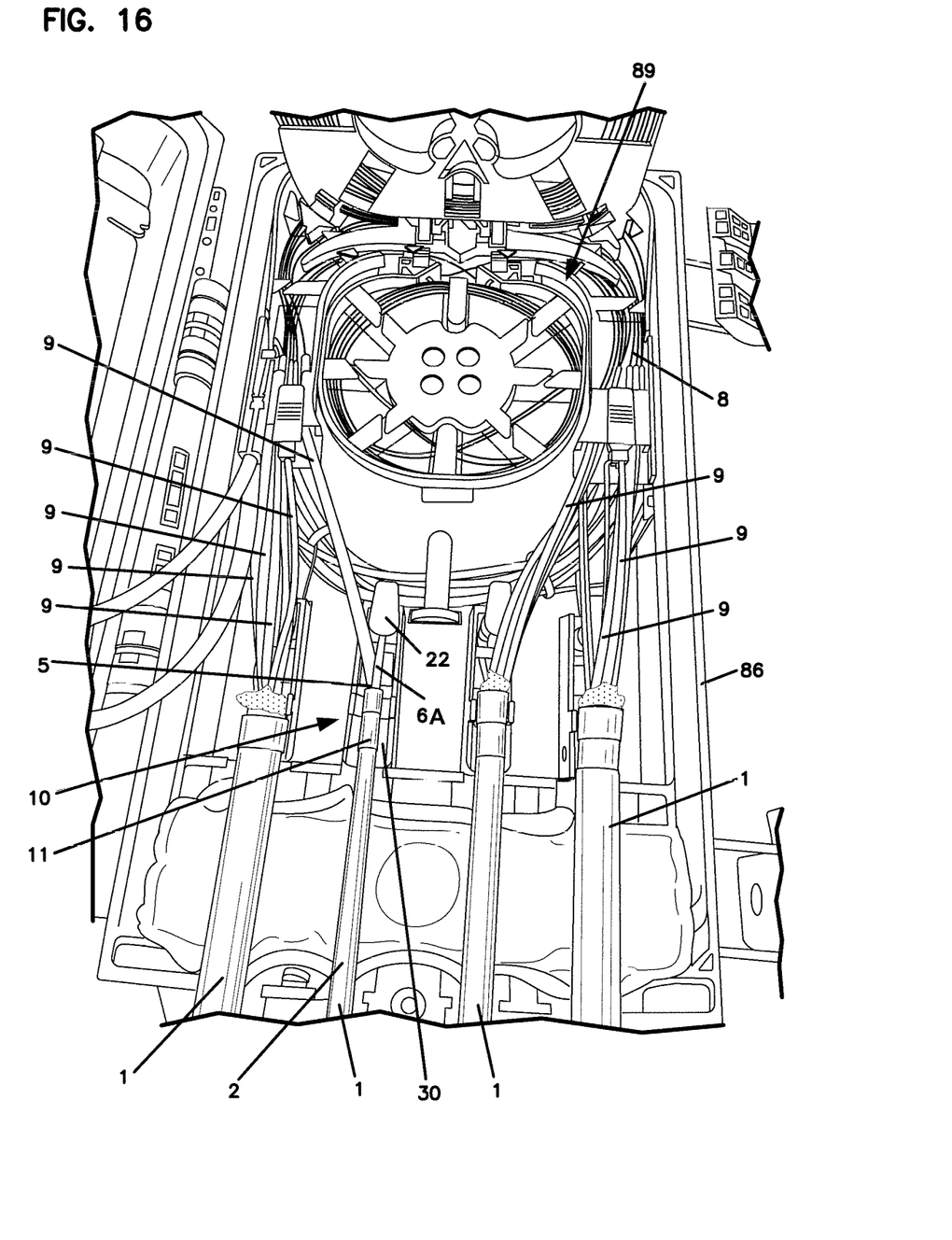
FIG. 16 is a perspective view of a portion of an example telecommunications closure including a portion of a cable fixation assembly according to the present disclosure.

Referring now to FIG. 16, an example telecommunications closure 86 is shown in an open configuration. Four cables 1 enter the closure 86 via ports defined by the closure. Each of the cables 1 is secured to one of four cable fixation units 10. Optical fibers 8 housed in sheaths 9 that protrude from the interior volumes defined by the outer jackets 2 of the cables 1 are organized and/or spliced in the splice/organizing area 89 of the closure 86. For example, two of the four cables 1 can be "input" cables and the other two can be "output" cables, with optical fibers 8 from an input cable being spliced within the closure 86 to optical fibers of an output cable.

Each of the cables 1 is secured to the cable jacket mounting portion 30 of the corresponding cable fixation unit 10 with a strap 11. Distally protruding portions of the cable strength members of the cables 1 are clamped in the clamp 22 of the corresponding cable fixation unit 10.

The strength member 6A is shown without a strength member constraining sleeve, thereby illustrating the exposed axial segment of the strength member defined between the proximal end of the clamping region 23 of the clamp 22 and the distal end 5 of the interior volume of the cable 1 that is liable to buckling and breakage without introduction of a strength member constraining sleeve as described herein.

Although in the foregoing description, terms such as "top," "bottom," "front," "back"/"rear," "horizontal," and "vertical" were used for ease of description and illustration in relating features to one another, no restriction on the use of the components and assemblies of this disclosure is intended by such use of the terms. Having described the preferred aspects and embodiments of the present disclosure, modifications and equivalents of the disclosed concepts may readily occur to one skilled in the art. However, it is intended that such modifications and equivalents be included within the scope of the claims which are appended hereto.

What is claimed is:

1. A cable fixation assembly comprising:
   an optical cable having an outer jacket defining an axially extending interior volume, the cable further comprising an optical fiber and a strength member partially disposed within the interior volume, the at least one strength member axially protruding beyond a distal end of the interior volume;
   a cable fixation unit defining a cable jacket mounting portion;
   a strength member clamp disposed distally from the cable jacket mounting portion, a distal portion of the strength member being disposed within a clamping region of the strength member clamp such that an axial segment of the strength member has an axial length defined between a proximal end of the clamping region and the distal end of the interior volume; and
   a strength member constraining sleeve having a wall that at least substantially radially surrounds at least 50% of the axial length of the axial segment of the strength member.

2. The cable fixation assembly of claim 1, wherein the wall of the strength member constraining sleeve at least substantially radially surrounds at least 60% of the axial length of the axial segment of the strength member.

3. The cable fixation assembly of claim 1, wherein the wall of the strength member constraining sleeve at least substantially radially surrounds at least 70% of the axial length of the axial segment of the strength member.

4. The cable fixation assembly of claim 1, wherein the wall of the strength member constraining sleeve at least substantially radially surrounds at least 80% of the axial length of the axial segment of the strength member.

5. The cable fixation assembly of claim 1, wherein the strength member constraining sleeve is deformable and at least partially deformed by the strength member clamp.

6. The cable fixation assembly of claim 1, wherein the strength member constraining sleeve includes a cover defining a distal end of the strength member constraining sleeve, and wherein a distal end of the strength member abuts a proximally facing surface of the cover.

7. The cable fixation assembly of claim 1, wherein the strength member constraining sleeve includes an axial slit defined between two ends of the wall.

8. The cable fixation assembly of claim 1, wherein the wall of the strength member constraining sleeve includes one or more holes.

9. The cable fixation assembly of claim 1, wherein an axial strip of the wall of the strength member constraining sleeve is substantially flat.

10. A cable fixation assembly comprising:
    an optical cable having an outer jacket defining an axially extending interior volume, the cable further comprising an optical fiber and a strength member partially disposed within the interior volume, the at least one strength member axially protruding beyond a distal end of the interior volume;
    a cable fixation unit having a main body defining a cable jacket mounting portion and a strength member clamp disposed distally from the cable jacket mounting portion, a distal portion of the strength member being disposed within a clamping region of the strength member clamp such that an axial segment of the strength member has an axial length defined between a proximal end of the clamping region and the distal end of the interior volume; and
    a strength member constraining sleeve having a wall that at least substantially radially surrounds at least 50% of the axial length of the axial segment of the strength member.

11. The assembly of claim 10, further comprising a telecommunications closure, wherein the cable fixation unit is affixed to the telecommunications closure and disposed in an interior volume defined by the telecommunications closure.

12. The cable fixation assembly of claim 10, wherein the wall of the strength member constraining sleeve at least substantially radially surrounds at least 80% of the axial length of the axial segment of the strength member.

13. An optical cable strength member constraining sleeve, comprising:
    a substantially tubular and deformable wall defining an interior volume having proximal and distal ends;
    an axially extending slit defined between two ends of the wall;
    at least one hole in the wall and in communication with the interior volume; and
    a cover coupled to the wall and adjacent to the distal end of the interior volume.

14. The optical strength member constraining sleeve of claim 13, wherein an axial strip of the wall is at least substantially flat.

15. A method comprising:
    stripping a jacket of a distal portion of a fiber optic cable, the jacket of the fiber optic cable defining an axially extending interior volume holding at least one optical fiber and at least one strength member;
    cutting a distal section of the strength member such that a protruding portion of the strength member axially protrudes from a distal end of the interior volume of the cable by a predefined distance;
    positioning a strength member constraining sleeve about the protruding portion of the strength member such that a wall of the strength member constraining sleeve substantially radially surrounds the protruding portion of the strength member;
    clamping the protruding portion of the strength member in a clamping region of a strength member clamp; and
    clamping a jacketed portion of the cable to a cable fixation unit;
    wherein an axial length of an axial segment of the strength member is defined between a proximal end of the clamping region and the distal end of the interior volume; and wherein the wall of the strength member constraining sleeve at least substantially radially surrounds at least 50% of the axial length of the axial segment of the strength member.

16. The method of claim 15, wherein the clamping of the protruding portion of the strength member includes clamping the strength member constraining sleeve in the clamping region of the strength member clamp.

17. The method of claim 16, wherein the clamping of the strength member constraining sleeve includes deforming the strength member constraining sleeve.

18. The method of claim 17, wherein the strength member constraining sleeve includes one or more holes in the wall and/or an axially extending slit to facilitate deforming the strength member sleeve in the strength member clamp.

19. The method of claim 15, wherein the clamping of the jacketed portion of the cable includes tightening a strap around the jacketed portion of the cable and securing the strap to the cable fixation unit.

20. The method of claim 15, further comprising affixing the cable fixation unit to a telecommunications closure.

21. The method of claim 15, wherein the wall of the strength member constraining sleeve at least substantially radially surrounds at least 90% of the axial length of the axial segment of the strength member.

22. The method of claim 15, wherein the wall of the strength member constraining sleeve at least substantially radially surrounds at least 99% of the axial length of the axial segment of the strength member.

* * * * *